United States Patent [19]

Mamedov et al.

[11] Patent Number: 5,116,915
[45] Date of Patent: May 26, 1992

[54] METHOD OF CONTROLLING POLYMERIZATION PROCESS OF OLEFINIC HYDROCARBONS

[75] Inventors: Ulchar A. O. Mamedov, Moscow; Anatolyi E. Tokar, Toljatti, both of U.S.S.R.; George J. Elbaum, Hermosa Beach, Calif.

[73] Assignee: Giprokautchuk, Moscow, U.S.S.R.

[21] Appl. No.: 138,153

[22] Filed: Dec. 28, 1987

[51] Int. Cl.$^5$ ............................ C08F 4/14; C08F 10/10
[52] U.S. Cl. .......................... 526/60; 526/59; 526/88; 526/339
[58] Field of Search ................. 526/59, 60, 61, 88

[56] References Cited

U.S. PATENT DOCUMENTS

| | | | |
|---|---|---|---|
| 3,256,262 | 6/1966 | Irvin | 260/94.3 |
| 3,433,775 | 3/1969 | Ray et al. | 526/59 |

FOREIGN PATENT DOCUMENTS

| | | | |
|---|---|---|---|
| 964353 | 3/1975 | Canada | 526/60 |
| 53585 | 6/1982 | European Pat. Off. | |
| 104985 | 4/1974 | German Democratic Rep. | |
| 260173 | 4/1970 | U.S.S.R. | 526/60 |
| 1112032 | 9/1984 | U.S.S.R. | 526/59 |

Primary Examiner—Edward J. Smith
Attorney, Agent, or Firm—John A. Sarjeant; David W. Collins; Joseph H. Golant

[57] ABSTRACT

A method is disclosed for controlling the polymerization process of olefinic hydrocarbons in an inert solvent which provides continuous control of Mooney viscosity and molecular weight distribution of the obtained polymer. In the disclosed method, means (4, 5) are included for measuring the temperature of a polymer solution in different parts of a reactor (1) provided with agitation (2), as well as means (6) for measuring the dynamic or kinematic viscosity of the polymer solution and means (7) for measuring the polymer concentration in the solution. A valve (8) mounted on the catalyst feed line controls the catalyst flow rate. A computer (9) is used to control the entire process by calculating the Mooney viscosity from the dynamic viscosity and polymer concentration and adjusting the process parameters as necessary to achieve a pre-set Mooney viscosity. The computer also is used to maintain a temperature difference between sections of the reactor and thus obtain a polymer with a desired molecular weight distribution.

7 Claims, 1 Drawing Sheet

METHOD OF CONTROLLING POLYMERIZATION PROCESS OF OLEFINIC HYDROCARBONS

TECHNICAL FIELD

This invention relates to the method of controlling polymerization process of olefinic hydrocarbons in the medium of inert solvent. In one aspect the invention relates to the method for controlling Mooney viscosity and molecular weight distribution of the obtained product in polymerization process of isolefin copolymers and multiolefins, in particular butyl rubber.

BACKGROUND ART

A number of methods of controlling the polymerization process of olefinic hydrocarbons in a medium of different inert solvents are known. One method disclosed in U.S. Pat. No. 3,256,262, "Measurement and Control of Mooney Viscosity in the Polymerization of Conjugated Dienes", consists of measuring the concentration of polymer in the solvent and the viscosity of the polymer solution in the polymerization system, calculating the Mooney viscosity of the obtained polymer and by its value controlling the process technological parameters.

However, the above-mentioned cannot provide sufficiently high quality of polymer required in butyl rubber production, in particular by isobutylene and isoprene copolymerization carried out in inert solvent in the presence of catalysts of aluminum chloride type (patent DDR No. 104985). The fact is that, for butyl rubber production, the molecular weight distribution (MWD) in polymer is as important as the Mooney viscosity. Besides, as a rule, butyl rubbers which have high Mooney viscosity require relatively narrow MWD while butyl rubbers which have low Mooney viscosity require a broad MWD.

It is also known that molecular weight of butyl rubber produced by in-solvent polymerization is very sensitive to process temperature. According to results of several researchers a change of process temperature of 1° C. may result in a change of molecular weight of obtained polymer of up to 50,000. The above process is also characterized by a high constant of reaction rate and a high exothermic effect. For this reason rate and a high exothermic effect. For this reason the polymerization of butyl rubber in solvent is preferably carried out in a cooled reactor; for example, according to Europatent No. 53585 a reactor which has a cooling jacket plus additional cooling surface in the form of a double-wall rotating cylinder installed coaxially to the vessel body and inside of which there is an axial pump for mixing of the reaction components. As a rule, the axial pump is installed in the bottom of the vessel and the catalyst, solvent, and the monomers are also fed into the vessel at the bottom. Thus the pump performs two tasks: rapid and effective mixing of monomers and catalyst, and also a rapid displacement of reaction mass from the bottom section to prevent excessive temperature at this location which would result from the high rate and exothermicity of the reactions. The efficiency of the axial pump thus determines the uniformity of temperatures in the reactor.

It is also known that the method of controlling butyl rubber polymerization in solution which consists of controlling the rotation rate of the agitator in a reactor, in particular the axial pump in the reactor according to the above invention, depends on the temperature drop between the upper and lower sections of the vessel (USSR Author Certificate No. 1271045). However, this method also does not ensure the required quality of different grades of butyl rubber because it uses the temperature drop between the lower and upper parts of the reactor only as a method of controlling the mixing rate in the vessel and not for controlling the properties of the obtained polymer.

DISCLOSURE OF INVENTION

The aim of the present invention is a method of controlling the polymerization process of olefinic hydrocarbons in an inert solvent which provides continuous control of Mooney viscosity and molecular weight distribution of the obtained polymer. This aim is achieved by measuring the temperature of the polymer solution in different parts of the reactor, also the dynamic or kinematic viscosity of the polymer solution and the polymer concentration in the solution, then using these values of viscosity and concentration to calculate the Mooney viscosity of the polymer and, depending on its value, adjusting the process variables which effect the above index in order to obtain butyl rubber with the desired Mooney viscosity, and, depending on its value, maintaining specific temperature difference between the upper and lower sections of the reactor and thus obtaining a polymer with the desired MWD. It is possible to control the temperature difference between the upper and lower parts of the reactor by changing either the rotation speed of the axial pump or its pitch.

BRIEF DESCRIPTION OF THE DRAWING

The sole FIGURE is a schematic diagram depicting apparatus suitable in the practice of the invention.

BEST MODES FOR CARRYING OUT THE INVENTION

Figure 1:
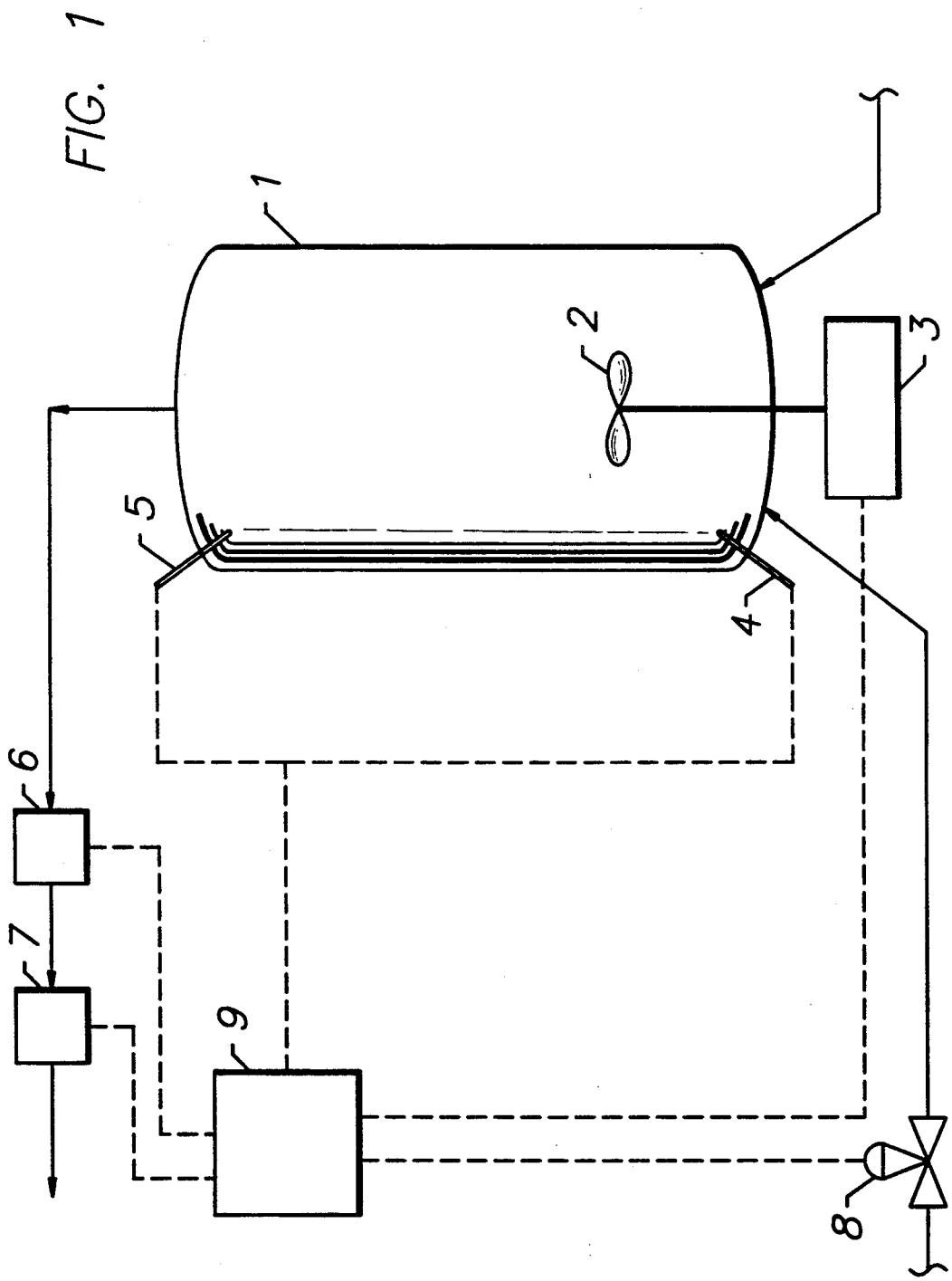

The essence of the invention is shown on the diagram which includes the following equipment: reactor (1), with an agitation (2), in particular an axial pump driven by a motor drive (3), and a minimum of two sensors (4 and 5) for measurement of reaction mass temperature, one in the bottom and one in the top of the reactor. Instruments for measuring dynamic or kinematic viscosity of the solution (6) and its polymer concentration (7) are mounted on the solution discharge line. Valve (8) mounted on the catalyst feed line controls the catalyst flow rate. It is preferable to use a computer (9) to control the entire process.

The polymerization reaction takes place in vertical reaction zone the reactor between a constant supply of monomers and a variable supply of catalyst solution said supply being introduced into the lower end of the vertical reaction zone. Agitator (2) circulates the reaction mass in the vessel and produces a more uniform temperature distribution. Instruments (6) and (7) produce signals in proportion to the measured indices, transmit these signals to the computer (9) which calculates the Mooney viscosity of the obtained polymer. Based on this value, the computer produces a signal to correct the technological process parameters and obtain the desired value of Mooney viscosity. In particular, this may be the flow rate of the catalyst solution into the reactor as controlled by valve (8). The computer also receives data from temperature sensors (4 and 5). Based on the known dependence of molecular weight distribution MWD on temperature difference between upper and lower zones of the reactor and also the desired index of MWD for each Mooney viscosity in different grades of butyl rubber, the computer produces a controlling signal to the agitator, effecting the above-mentioned temperature difference. In particular, such signal may be used to control the rotation rate or the pitch of the agitator to change its effectiveness in circulating the reaction mass.

EXAMPLE 1

In reactor (1) having a volume of 10 cu m, synthesis of butyl rubber is carried out in an isopentane solvent in the presence of an aluminum chloride catalyst. Average temperature in the polymerizer is maintained at $-80°$ C. The concentration of polymer in the solution stream measured at the reactor outlet by an instrument (7), specifically a refractometer, is 8 percent. The dynamic viscosity of the said solution measured by a rotary viscosimeter (6) has a value of 600 centipoise. On the basis of this data calculated by the computer (9), the Mooney viscosity of the resulting polymer is 75 units of $100°$ C. This value of Mooney viscosity is maintained constant by feeding into the reactor 0.2 grams of catalyst solution per 1 kg of rubber, said feed rate controlled by valve (8). Mixing in the reactor is implemented by axial pump with a propeller diameter of 400 mm. To obtain rubber with a value of MWD polydispersity not exceeding 2.5, the temperature difference between the upper and lower reactor zones, as measured by temperature sensors (4 and 5) should be $2°$ C. This difference, i.e., $-79°$ C. at the bottom and $-81°$ C. at the top of the reactor, is obtained by maintaining the speed of rotation of the axial pump at 500 RPM by a control signal from the computer to a variable-speed pump drive (3).

EXAMPLE 2

According to Example 1, it is desired to produce rubber with Mooney viscosity of 45 units. For this purpose the computer maintains catalyst flow rate to the reactor of 0.14 grams per kilogram of rubber. The resulting average temperature in the reactor is $-75°$ C. The polymer concentration in solution at the reactor outlet as measured by instrument (7) is 10.5 percent, and the dynamic viscosity of the solution as measured by instrument (6) is 450 centipoise. This results in a Mooney viscosity of 45. For this value of Mooney viscosity the desired degree of polydispersion is 5. This condition is obtained by maintaining temperature of $-77°$ C. at the bottom of the reactor and $-73°$ C. at the top, i.e., a $4°$ C. difference, by adjusting the pitch of the axial pump (2) by a control signal from the computer (9).

What we claim is:

1. A method of controlling polymerization of an olefinic hydrocarbon comprising introducting said hydrocarbon, a catalyst, and an inert solvent into the lower end of a vertical reaction zone, agitating said hydrocarbon, catalyst, and solvent to form a reaction mass by means of said agitating throughout said reaction zone, withdrawing said reaction mass from the upper end of said reaction zone, determining temperatures of said reaction zone near its lower and upper ends, measuring dynamic or kinematic viscosity and the concentration of polymer in said withdrawn reaction mass, transmitting said viscosity and concentration measurements to means for determining Mooney viscosity of said polymer, and depending on said Mooney viscosity of said polymer, maintaining a specific temperature difference between the upper and lower ends of said reaction zone by varying speed or pitch of said means for said agitating to obtain a polymer with a desired molecular weight distribution.

2. The method of claim 1 wherein the means for calculating Mooney viscosity comprises computer means.

3. The method of claim 2 wherein the temperatures of the reaction zone near its lower and upper ends are transmitted to said computer means.

4. The method of claim 1 wherein means for said agitating comprises an axial flow pump.

5. The method of claim 4 wherein the temperature difference between the lower and upper ends of said reaction zone is maintained by varying the pitch of said axial flow pump.

6. The method of claim 1 wherein the resultant polymerized olefinic hydrocarbon is butyl rubber.

7. The method of claim 6 wherein said catalyst comprises aluminum chloride and said solvent comprises isopentane.

* * * * *